United States Patent
Cook et al.

(10) Patent No.: US 8,901,880 B2
(45) Date of Patent: Dec. 2, 2014

(54) WIRELESS POWER TRANSMISSION FOR PORTABLE WIRELESS POWER CHARGING

(75) Inventors: Nigel P. Cook, El Cajon, CA (US); Lukas Sieber, Olten (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 12/543,235

(22) Filed: Aug. 18, 2009

(65) Prior Publication Data

US 2010/0127660 A1 May 27, 2010

Related U.S. Application Data

(60) Provisional application No. 61/090,180, filed on Aug. 19, 2008, provisional application No. 61/104,225, filed on Oct. 9, 2008, provisional application No. 61/139,611, filed on Dec. 21, 2008.

(51) Int. Cl.
| | |
|---|---|
| *H02J 7/00* | (2006.01) |
| *H02J 7/04* | (2006.01) |
| *H01Q 1/24* | (2006.01) |
| *H02J 17/00* | (2006.01) |
| *H02J 7/02* | (2006.01) |
| *H04B 5/00* | (2006.01) |
| *H01Q 7/00* | (2006.01) |

(52) U.S. Cl.
CPC .............. *H01Q 1/248* (2013.01); *H02J 17/00* (2013.01); *H02J 7/025* (2013.01); *H04B 5/0025* (2013.01); *H04B 5/0037* (2013.01); *H01Q 7/005* (2013.01)
USPC ........... 320/108; 320/107; 320/112; 320/113; 320/114; 320/115; 455/41.1; 455/41.2; 455/418

(58) Field of Classification Search
USPC ................. 320/108, 107, 112, 113, 114, 115; 455/41.1, 41.2, 418
See application file for complete search history.

(56) References Cited

U.S. PATENT DOCUMENTS

| | | | |
|---|---|---|---|
| 6,008,622 A | | 12/1999 | Nakawatase |
| 7,518,267 B2 * | | 4/2009 | Baarman ....................... 307/150 |

(Continued)

FOREIGN PATENT DOCUMENTS

| | | |
|---|---|---|
| DE | 8814993 | 4/1989 |
| EP | 0977297 A1 | 2/2000 |

(Continued)

OTHER PUBLICATIONS

International Search Report—PCT/US2009/054354—International Search Authority, European Patent Office, Nov. 18, 2009.

(Continued)

*Primary Examiner* — Edward Tso
*Assistant Examiner* — Alexis A Boateng
(74) *Attorney, Agent, or Firm* — Knobbe, Martens, Olson & Bear, LLP

(57) ABSTRACT

Exemplary embodiments are directed to wireless power transfer. A portable wireless power charger includes an antenna configured to generate a magnetic near-field for coupling of wireless power to a wireless powered device including a receiver. The antenna is substantially disposed around the perimeter of the charging pad. The portable wireless power charger further includes a feeder cable for coupling the input power to the charging pad.

20 Claims, 12 Drawing Sheets

(56) References Cited

U.S. PATENT DOCUMENTS

| | | | |
|---|---|---|---|
| 7,741,734 B2 | 6/2010 | Joannopoulos et al. | |
| 7,825,543 B2 * | 11/2010 | Karalis et al. | 307/104 |
| 7,826,873 B2 * | 11/2010 | Telefus | 455/573 |
| 8,013,568 B2 * | 9/2011 | Park et al. | 320/108 |
| 8,040,103 B2 * | 10/2011 | Hui et al. | 320/108 |
| 8,339,096 B2 * | 12/2012 | Osada | 320/108 |
| 2005/0134213 A1 * | 6/2005 | Takagi et al. | 320/108 |
| 2007/0090790 A1 * | 4/2007 | Hui | 320/108 |
| 2008/0278112 A1 * | 11/2008 | Hui et al. | 320/108 |
| 2008/0278264 A1 * | 11/2008 | Karalis et al. | 333/219 |
| 2009/0237029 A1 * | 9/2009 | Andelfinger | 320/108 |
| 2009/0284083 A1 | 11/2009 | Karalis et al. | |
| 2009/0308933 A1 * | 12/2009 | Osada | 235/492 |
| 2010/0041332 A1 * | 2/2010 | Flygh et al. | 455/41.1 |
| 2010/0045114 A1 * | 2/2010 | Sample et al. | 307/104 |
| 2010/0109445 A1 | 5/2010 | Kurs et al. | |
| 2010/0127660 A1 * | 5/2010 | Cook et al. | 320/108 |
| 2010/0148589 A1 | 6/2010 | Hamam et al. | |
| 2010/0289449 A1 | 11/2010 | Elo | |

FOREIGN PATENT DOCUMENTS

| | | |
|---|---|---|
| JP | 11095922 | 4/1999 |
| KR | 20070017804 A | 2/2007 |
| WO | WO03105308 | 12/2003 |
| WO | WO2007012272 | 2/2007 |

OTHER PUBLICATIONS

Written Opinion—PCT/US2009/054354, International Search Authority, European Patent Office Nov. 18, 2009.

* cited by examiner

WIRELESS POWER TRANSMISSION FOR PORTABLE WIRELESS POWER CHARGING

CLAIM OF PRIORITY UNDER 35 U.S.C. §119

This application claims priority under 35 U.S.C. §119(e) to:

U.S. Provisional Patent Application 61/090,180 entitled "Wireless Desktop v3" filed on Aug. 19, 2008, the disclosure of which is hereby incorporated by reference in its entirety.

U.S. Provisional Patent Application 61/104,225 entitled "Wireless Power Transfer via Coupled Resonant Structures" filed on Oct. 9, 2008, the disclosure of which is hereby incorporated by reference in its entirety.

U.S. Provisional Patent Application 61/139,611 entitled "Wireless Recharging of Toy Electric Vehicle Models" filed on Dec. 21, 2008, the disclosure of which is hereby incorporated by reference in its entirety.

BACKGROUND

1. Field

The present invention relates generally to wireless charging, and more specifically to devices, systems, and methods related to portable wireless charging systems.

2. Background

Typically, each powered device such as a wireless electronic device requires its own wired charger and power source, which is usually an alternating current (AC) power outlet. Such a wired configuration becomes unwieldy when many devices need charging.

Approaches are being developed that use over-the-air or wireless power transmission between a transmitter and a receiver coupled to the electronic device to be charged. The receive antenna collects the radiated power and rectifies it into usable power for powering the device or charging the battery of the device.

Wireless energy transmission may be based on coupling between a transmit antenna, a receive antenna and a rectifying circuit embedded in the host electronic device to be powered or charged. Shortcomings are realized when the transmit antenna is integrated into a substantially stationary infrastructure or are of a substantial nature creating portability issues. Furthermore, collocation of the AC power source with wireless electronic device's user-interaction area about the transmit antenna, creates an unnecessary safety concern. Therefore, there is a need to provide a wireless charging arrangement that accommodates flexible placement of a transmitter in a wireless powering and charging system.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted from a transmitter to a receiver without the use of physical electromagnetic conductors. Power conversion in a system is described herein to wirelessly charge devices including, for example, mobile phones, cordless phones, iPod, MP3 players, headsets, etc. Generally, one underlying principle of wireless energy transfer includes magnetic coupled resonance (i.e., resonant induction) using frequencies, for example, below 30 MHz. However, various frequencies may be employed including frequencies where license-exempt operation at relatively high radiation levels is permitted, for example, at either below 135 kHz (LF) or at 13.56 MHz (HF). At these frequencies normally used by Radio Frequency Identification (RFID) systems, systems must comply with interference and safety standards such as EN 300330 in Europe or FCC Part 15 norm in the United States. By way of illustration and not limitation, the abbreviations LF and HF are used herein where "LF" refers to $f_0$=135 kHz and "HF" to refers to $f_0$=13.56 MHz.

Figure 1:
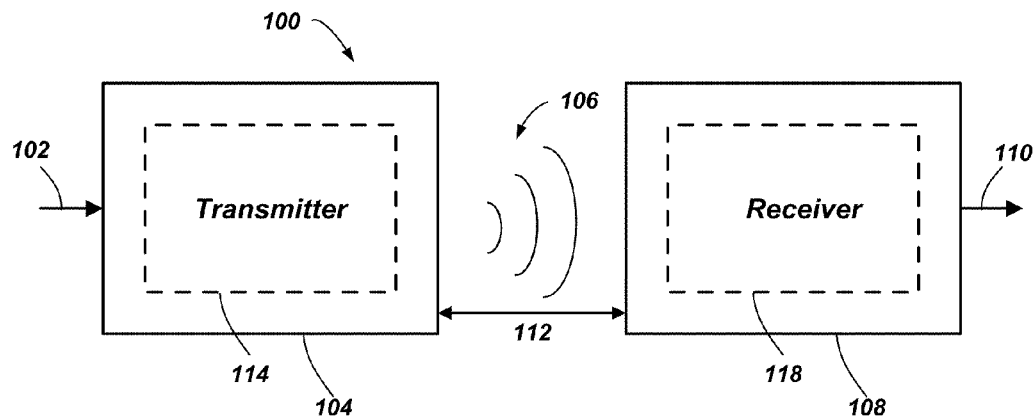
FIG. 1 illustrates a simplified block diagram of a wireless power transmission system.

FIG. 1 illustrates wireless power transmission system 100, in accordance with various exemplary embodiments. Input power 102 is provided to a transmitter 104 for generating a magnetic field 106 for providing energy transfer. A receiver 108 couples to the magnetic field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are matched, transmission losses between the transmitter 104 and the receiver 108 are minimal when the receiver 108 is located in the "near-field" of the magnetic field 106.

Transmitter 104 further includes a transmit antenna 114 for providing a means for energy transmission and receiver 108 further includes a receive antenna 118 for providing a means for energy reception or coupling. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far-field. In this near-field, a coupling may be established between the transmit antenna 114 and the receive antenna 118. The area around the antennas 114 and 118 where this near-field coupling may occur is referred to herein as a coupling-mode region.

Figure 2:
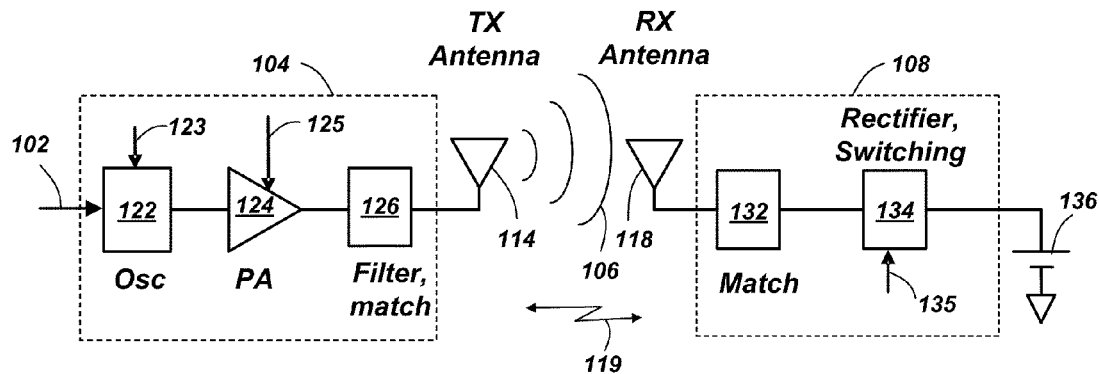
FIG. 2 illustrates a simplified schematic diagram of a wireless power transmission system.

FIG. 2 shows a simplified schematic diagram of a wireless power transmission system. The transmitter 104, driven by input power 102, includes an oscillator 122, a power amplifier 124 and a filter and matching circuit 126. The oscillator is configured to generate a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118.

Figure 3:
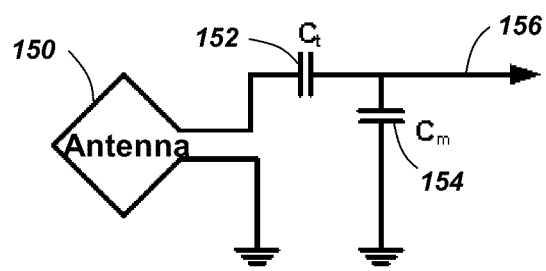
FIG. 3 illustrates a schematic diagram of a loop antenna, in accordance with exemplary embodiments.

As illustrated in FIG. 3, antennas used in exemplary embodiments may be configured as a "loop" antenna 150, which may also be referred to herein as a "magnetic," "resonant" or a "magnetic resonant" antenna. Loop antennas may be configured to include an air core or a physical core such as a ferrite core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more effective.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop antennas is based on the inductance and capacitance. Inductance in a loop antenna is generally the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates a sinusoidal or quasi-sinusoidal signal 156. Accordingly, for larger diameter loop antennas, the size of capacitance needed to induce resonance decreases as the diameter or inductance of the loop increases. Furthermore, as the diameter of the loop antenna increases, the efficient energy transfer area of the near-field increases for "vicinity" coupled devices. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, antennas such as single and multi-turn loop antennas are used for both transmit (Tx) and receive (Rx) antenna systems since most of the environment possibly surrounding the antennas is dielectric and thus has less influence on a magnetic field compared to an electric field. Furthermore, antennas dominantly configured as "electric" antennas (e.g., dipoles and monopoles) or a combination of magnetic and electric antennas is also contemplated.

The Tx antenna can be operated at a frequency that is low enough and with an antenna size that is large enough to achieve good coupling efficiency (e.g., >10%) to a small Rx antenna at significantly larger distances than allowed by far-field and inductive approaches mentioned earlier. If the Tx antenna is sized correctly, high coupling efficiencies (e.g., 30%) can be achieved when the Rx antenna on a host device is placed within a coupling-mode region (i.e., in the near-field or a strongly coupled regime) of the driven Tx loop antenna The various exemplary embodiments disclosed herein identify different coupling variants which are based on different power conversion approaches, and the transmission range including device positioning flexibility (e.g., close "proximity" coupling for charging pad solutions at virtually zero distance or "vicinity" coupling for short range wireless power solutions). Close proximity coupling applications (i.e., strongly coupled regime, coupling factor typically k>0.1) provide energy transfer over short or very short distances typically in the order of millimeters or centimeters depending on the size of the antennas. Vicinity coupling applications (i.e., loosely coupled regime, coupling factor typically k<0.1) provide energy transfer at relatively low efficiency over distances typically in the range from 10 cm to 2 m depending on the size of the antennas.

As described herein, "proximity" coupling and "vicinity" coupling may require different matching approaches and may be considered as different methods of matching the power source/sink to the antenna/coupling network. Moreover, the various exemplary embodiments provide system parameters, design targets, implementation variants, and specifications for both LF and HF applications and for the transmitter and receiver. Some of these parameters and specifications may vary, as required for example, to better match with a specific power conversion approach. System design parameters may include various priorities and tradeoffs. Specifically, transmitter and receiver subsystem considerations may include high transmission efficiency, low complexity of circuitry resulting in a low-cost implementation.

Figure 4:
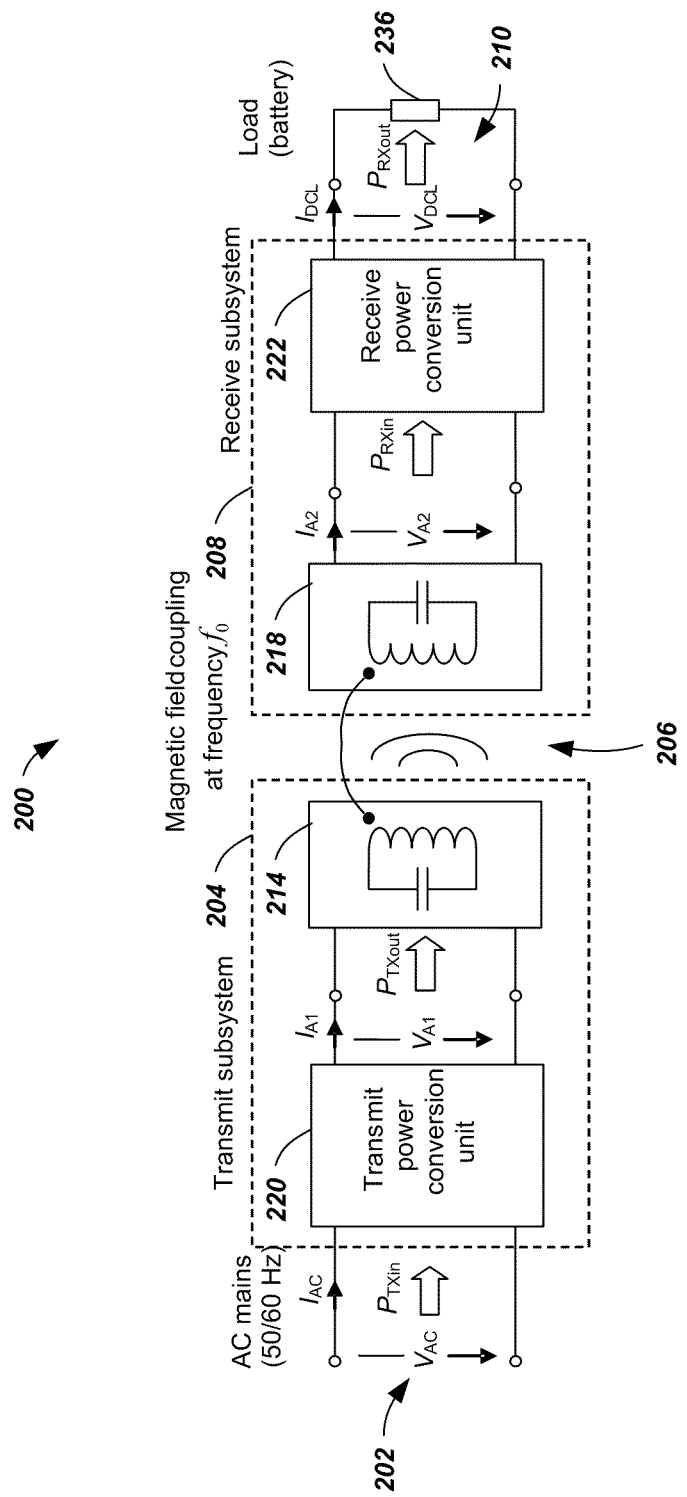
FIG. 4 illustrates a functional block diagram of a wireless power transmission system, in accordance with an exemplary embodiment.

FIG. 4 illustrates a functional block diagram of a wireless power transmission system configured for direct field coupling between a transmitter and a receiver, in accordance with an exemplary embodiment. Wireless power transmission system 200 includes a transmitter 204 and a receiver 208. Input power $P_{TXin}$ is provided to transmitter 204 for generating a predominantly non-radiative field with direct field coupling k 206 for providing energy transfer. Receiver 208 directly couples to the non-radiative field 206 and generates an output power $P_{RXout}$ for storing or consumption by a battery or load 236 coupled to the output port 210. Both the transmitter 204 and the receiver 208 are separated by a distance. In one exemplary embodiment, transmitter 204 and receiver 208 are configured according to a mutual resonant relationship and when the resonant frequency, $f_0$, of receiver 208 and the resonant frequency of transmitter 204 are matched, transmission losses between the transmitter 204 and the receiver 208 are minimal while the receiver 208 is located in the "near-field" of the radiated field generated by transmitter 204.

Transmitter 204 further includes a transmit antenna 214 for providing a means for energy transmission and receiver 208 further includes a receive antenna 218 for providing a means for energy reception. Transmitter 204 further includes a transmit power conversion unit 220 at least partially function as an AC-to-AC converter. Receiver 208 further includes a receive power conversion unit 222 at least partially functioning as an AC-to-DC converter.

Figure 5:
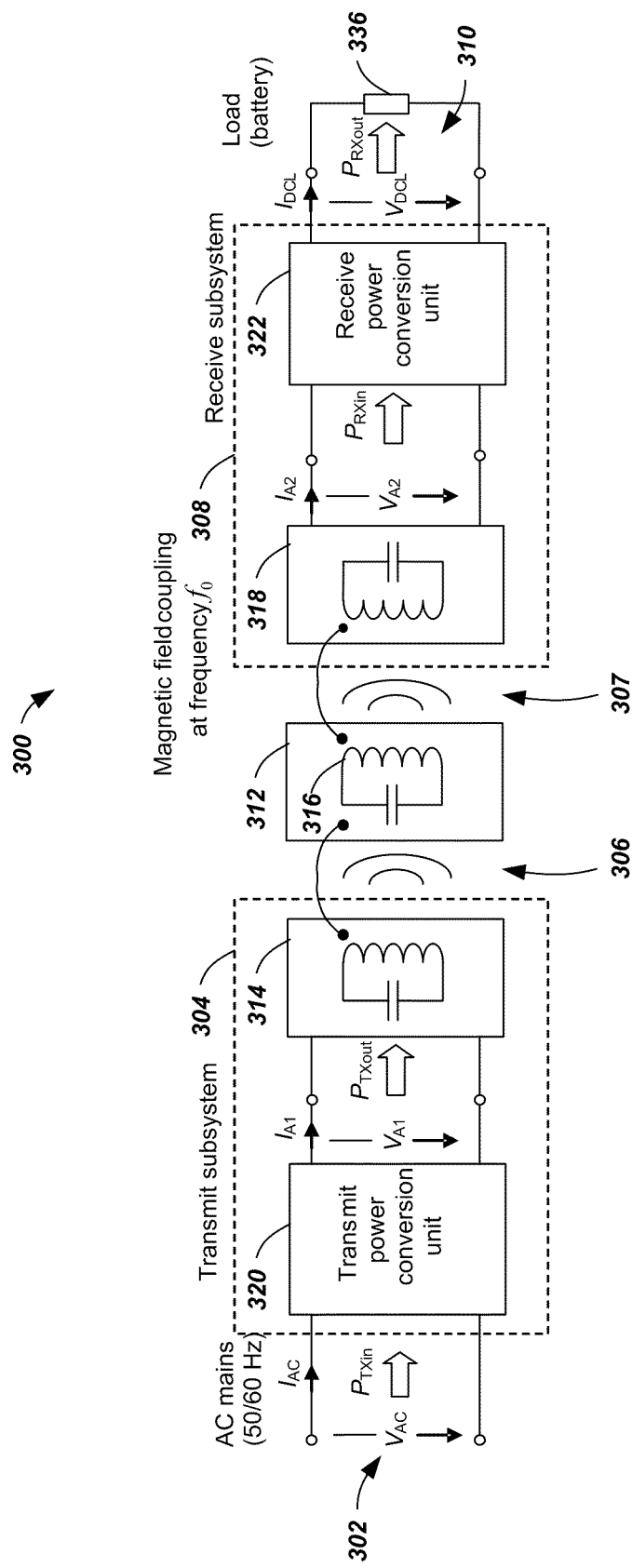
FIG. 5 illustrates a functional block diagram of a wireless power transmission system including a passive energy relay, in accordance with an exemplary embodiment.

FIG. 5 illustrates a functional block diagram of a wireless power transmission system configured for indirect field coupling between a transmitter, a passive energy relay and a receiver, in accordance with an exemplary embodiment. Wireless power transmission system 300 includes a transmitter 304, a passive energy relay (parasitic resonant tank or passive resonant tank) 312 and a receiver 308. Input power $P_{TXin}$ is provided to transmitter 304 for generating a predominantly non-radiative field with field coupling k 306 for providing energy transfer to passive energy relay 312 which generates a predominantly non-radiative field with field coupling 307 to receiver 308. Receiver 308 couples to the non-radiative field generated by passive energy relay 312 and generates an output power $P_{RXout}$ for storing or consumption by a battery or load 336 coupled to the output port 310.

Each of the transmitter 304, passive energy relay 312 and the receiver 308 are separated by a distance. In one exemplary embodiment, transmitter 304 and passive energy relay 312 are configured according to a mutual resonant relationship and when the resonant frequency, $f_0$, of passive energy relay 312 and the resonant frequency of transmitter 304 are matched, transmission losses between the transmitter 304 and the passive energy relay 312 are minimal while the passive energy relay 312 is located in the "near-field" of the radiated field generated by transmitter 304. Furthermore, passive energy relay 312 and receiver 308 are configured according to a mutual resonant relationship and when the resonant frequency, $f_0$, of receiver 308 and the resonant frequency of passive energy relay 312 are matched, transmission losses between the passive energy relay 312 and the receiver 308 are minimal while the receiver 308 is located in the "near-field" of the radiated field generated by passive energy relay 312.

Transmitter 304 further includes a transmit antenna 314 for providing a means for energy transmission, passive energy relay 312 further includes a parasitic tank 316 for providing a means for passively relaying energy, and receiver 308 further includes a receive antenna 318 for providing a means for energy reception. Transmitter 304 further includes a transmit power conversion unit 320 at least partially function as an AC-to-AC converter. Receiver 308 further includes a receive power conversion unit 322 at least partially functioning as an AC-to-DC converter.

Accordingly, highly resonant structures (i.e., high Q antennas) transfer energy from at least one energy source to at least one energy sink either directly, as in FIG. 4, or via one or more passive energy relays, as in FIG. 5. Furthermore, coupling may be via an electric or magnetic field, with the magnetic field exhibiting lower interaction with non-metallic objects as typically being present in the neighborhood of a system. As stated, resonant structures are electrically small (compared to wavelength) and, therefore, are substantially non-radiating with regard to electromagnetic waves and power loss.

Energy transmission may occur at a single frequency with substantially a non-modulated, non-pulsed high frequency carrier, which may be substantially harmonic. Furthermore, frequency selection may be based on various factors including reduction in risk of harmful interference to sensitive radio and non-radio systems particularly with respect to safety and security critical devices such as medical devices, etc. and to the host devices this technology will be integrated into. Additional frequency selection factors may include frequency selection to enable use of very high Q resonant systems and frequency selection to fit into very narrow frequency masks in ISM frequency bands (e.g., at 6.78 MHz and at 13.56 MHz) dedicated to power carrier transmission to short range devices.

Generally, energy transfer to receivers works in all directions/angles as seen from the transmit antenna, provided that receive or transmit antenna is favorably oriented. One realization of coupled magnetic resonance (or resonant induction) uses capacitively loaded, electrically conducting, single or multi turn loops forming a resonant L-C tank circuit with the loop/coil as a reactor and capacitor as anti-reactor. The loop coil may include ferromagnetic or ferrimagnetic materials. Other implementations may also include a magneto-mechanical system resonant at the operating frequency, for example, in the receiver.

Figure 6:
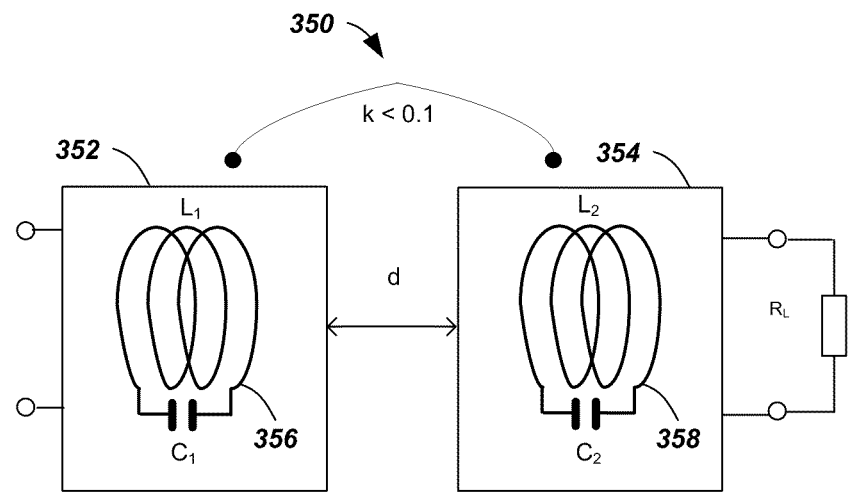
FIG. 6 illustrates proximity coupling of a transmitter and a receiver in a wireless power transmission system, in accordance with an exemplary embodiment.

FIG. 6 illustrates a functional block diagram of a first coupling variant between transmit and receive antennas, in accordance with an exemplary embodiment. The coupling variant 350 of FIG. 6 illustrates a "vicinity" coupling variant and may be used to couple to a high-Q resonant tank circuit used for "vicinity" coupling. Coupling variant 350 transforms impedances to match with power conversion circuitry resulting in an improved or high transfer efficiency. Specifically, coupling variant 350 includes a transmit antenna 352 configured to resonate and a resonant frequency and a receive antenna 354 configured to resonate at the same resonant frequency.

Transmit antenna 352 includes a high-Q tank resonator 356, including capacitor $C_1$ and inductor $L_1$. Receive antenna 354 includes a high-Q tank resonator 358, including capacitor $C_2$ and inductor $L_2$. Vicinity coupling applications (i.e., loosely coupled regime with a coupling factor typically k<0.1) provide energy transfer at relatively low efficiency over distances typically in the range from 10 cm to 2 m depending on the size of the antennas.

Figure 7:
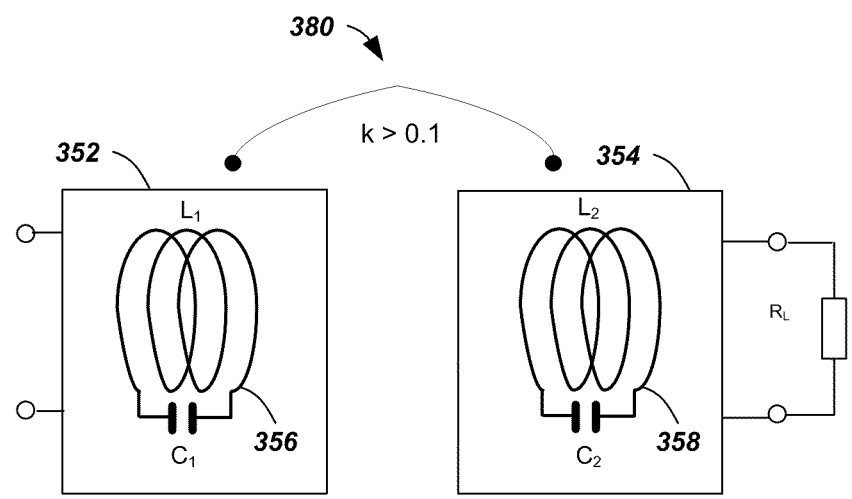
FIG. 7 illustrates vicinity coupling of a transmitter and a receiver in a wireless power transmission system, in accordance with an exemplary embodiment.

FIG. 7 illustrates a functional block diagram of a second coupling variant between transmit and receive antennas, in accordance with an exemplary embodiment. The coupling variant 380 of FIG. 7 illustrates a "proximity" coupling variant, in accordance with an exemplary embodiment. Coupling variant 380 includes coupled series tank circuits includes the transmit antenna 352 and the receive antenna 354 of FIG. 6, including the transmit antenna 352 including the high-Q tank resonator 356, including capacitor $C_1$ and inductor $L_1$, and the receive antenna 354 including the high-Q tank resonator 358, including capacitor $C_2$ and inductor $L_2$. Close proximity coupling applications (i.e., strongly coupled regime with a coupling factor typically k>0.1) provide energy transfer over short or very short distances d typically in the order of millimeters or centimeters, depending on the size of the antennas.

Generally, wireless power transfer according to resonant induction is improved by determining an optimum load resistance resulting in maximized transfer efficiency for given antenna parameters (e.g., unloaded Q-factors, L-C ratios, and transmitter source impedance). The optimum loading depends on coupling factor k. Conversely, there exists an optimum receive L-C ratio or load transformation maximizing efficiency for a given load resistance.

By way of exemplary calculation, the Q factor resulting when loaded with the optimum load resistance is called optimum loaded Q. In a loosely coupled regime (vicinity), the optimum loaded receive Q is generally lower but close to half of the unloaded receive Q, while in a strongly coupled regime (proximity), the optimum loaded Q is substantially lower than the unloaded receive Q.

Therefore, for the vicinity variant, assuming optimum loading, low efficiency, distance larger than antenna diameters but smaller than near-field range $\lambda/2\pi$, the antenna transfer efficiency can be approximately expressed as function of distance, where:

$$\eta_A(d) \cong \frac{r_{A,t}^3 \cdot r_{A,r}^3 \cdot Q_t \cdot Q_r}{16 \cdot d^6} \quad \text{Equation 1}$$

Where $r_{A,t}$ and $r_{A,r}$ denote equivalent radii, $Q_t$ and $Q_r$ unloaded Q-factors of transmit and receive antenna, respectively. Alternatively, efficiency may also be expressed as function of coupling factor k and unloaded Q-factors, where:

$$\eta_A(k) \cong \frac{k^2 \cdot Q_t \cdot Q_r}{4} \quad \text{Equation 2}$$

Equation 1 shows that distance effect (power of 6) can be compensated for by increasing transmit antenna radius or receive antenna radius or both or by increasing the Q-factors. To a certain extent, and as long as above assumption holds, low performance of small receive antennas can be outweighed with a large transmit antenna, which is beneficial to long range or wide area systems. Equation 1 also indicates that magnetic field strength rapidly decreases with increasing distance from transmit antenna (evanescent field), which is desirable with regard to radiation exposure and interference.

Since Equation 1 is not a function of frequency, Equation 1 is not determinative of optimum frequency. For frequency determination, one selection process may be based upon the frequency where highest Q-value can be achieved. Various contributing factors may include antenna form factor constraints, integration issues, and environmental effects.

Therefore, for the proximity variant, assuming optimum loading and high efficiency, the antenna transfer efficiency can be approximately expressed as function of coupling factor and unloaded Q, where:

$$\eta_A(k) \cong 1 - \frac{2}{k \cdot \sqrt{Q_t \cdot Q_r}} \quad \text{Equation 3}$$

Equation 3 illustrates that a high unloaded Q-value correlates to efficiency approaching 100% also in a strongly coupled regime (e.g. in a charging pad solution). It should be noted herein that efficiency has been defined as ratio of power output at receive antenna port to power input at transmit antenna port, antenna including anti-reactor for resonance, coupling, and any impedance transformation.

Table 1 lists exemplary frequency bands that have been identified as candidate frequencies for wireless transfer of electrical energy using coupled magnetic resonance. These frequency bands permit, for example, license exempt use at relatively high emission levels such as presently needed for short range devices (e.g. RFID systems). These exemplary frequency bands and their maximum permissible radiation levels are defined by ECC in EN 300330 [1] and in corresponding FCC norm. For systems primarily based on magnetic field coupling, magnetic field strength limits generally apply.

TABLE 1

| Frequency band | H-field strength limit in dBuA/m @ 10 m distance | Primary application |
| --- | --- | --- |
| LF: 119 ≤ f < 135 kHz | <68 (see Note 1) | Proximity and vicinity |
| HF1: 6.765 ≤ f ≤ 6.795 | 42 | Proximity |
| HF2: 13.553 ≤ f ≤ 13.567 | 60 | Proximity and vicinity |

Note 1: depending on size of antenna and precise frequency

By way of example, a generated H-field strength at LF may be 10 times (20 dB) higher than at HF2 to transfer same amount of power under same conditions. Though this does not seem reflected by the norm, the bands LF and HF2 are about equivalent with respect to their potential to transfer energy. This can be explained by the fact that the distance where the HF2 limit applies is already in the far-field zone (d>$\lambda/2\pi$) where field decays only with 20 dB per decade, while LF measurement distance is in the near-field where decay rate is 60 dB per decade. As a practical note, it has been found that HF exhibits improved application with regard to integration of magnetic resonance into electronic devices and particularly into mini devices (headsets, MP3 players, etc.). Furthermore, for LF there exist further bands below 119 kHz for license exempt use at high H-field strength levels. These bands that are mainly used by non- or semi-resonant induction systems are considered less favorable for coupled magnetic resonance and particularly with respect to integrated antenna performance.

Various applications of wireless power transmission have been proposed. One application of wireless power transmission is disclosed in U.S. patent application Ser. No. 12/351, 845 entitled "Wireless Desktop IT Environment" filed on Jan. 11, 2009, the disclosure of which, assigned to the assignee herein, is hereby incorporated by reference in its entirety.

Figure 8A:
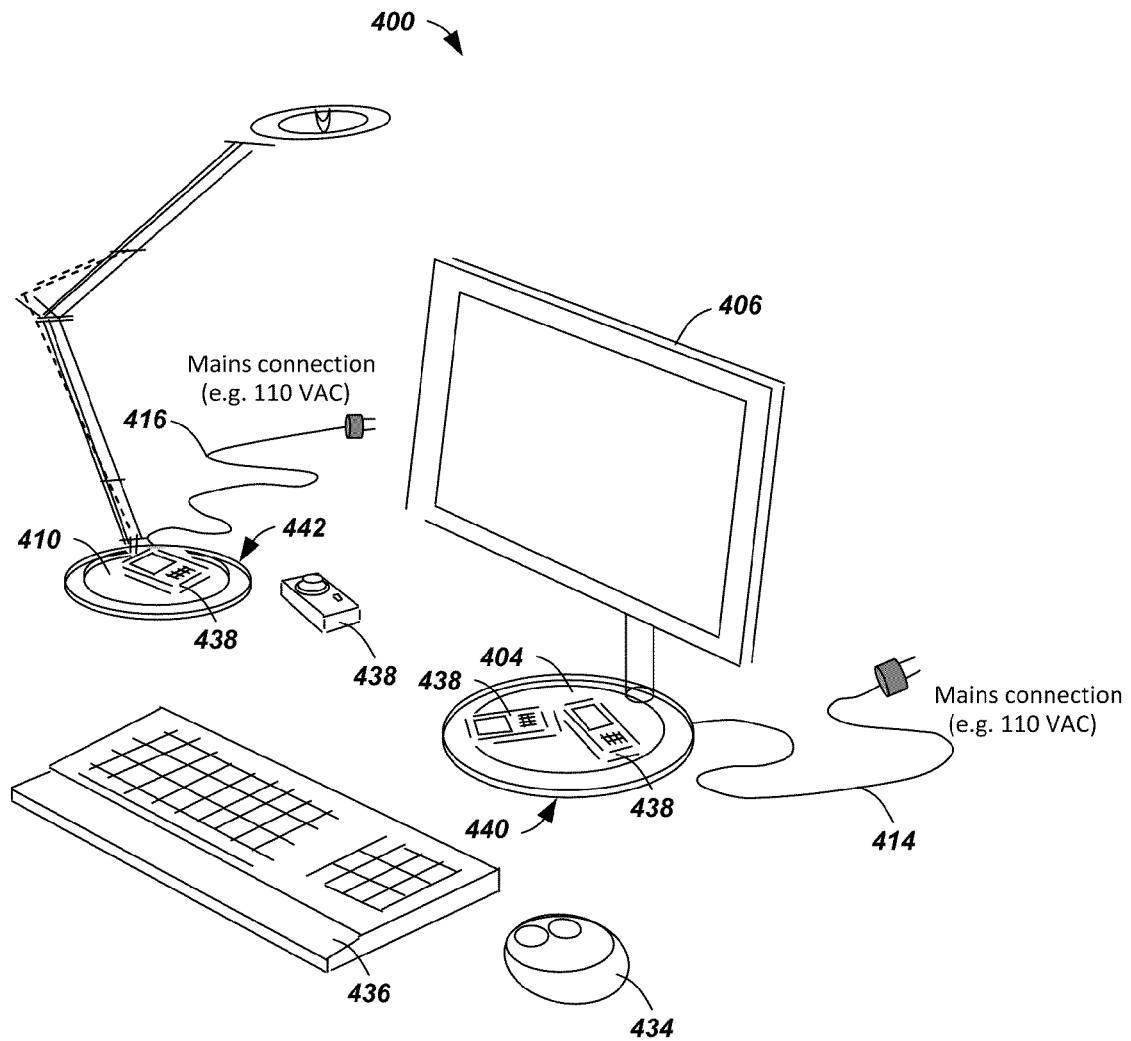
FIG. 8A illustrates a wireless power transmission system configured as a wireless desktop, in accordance with an exemplary embodiment.
Figure 8B:
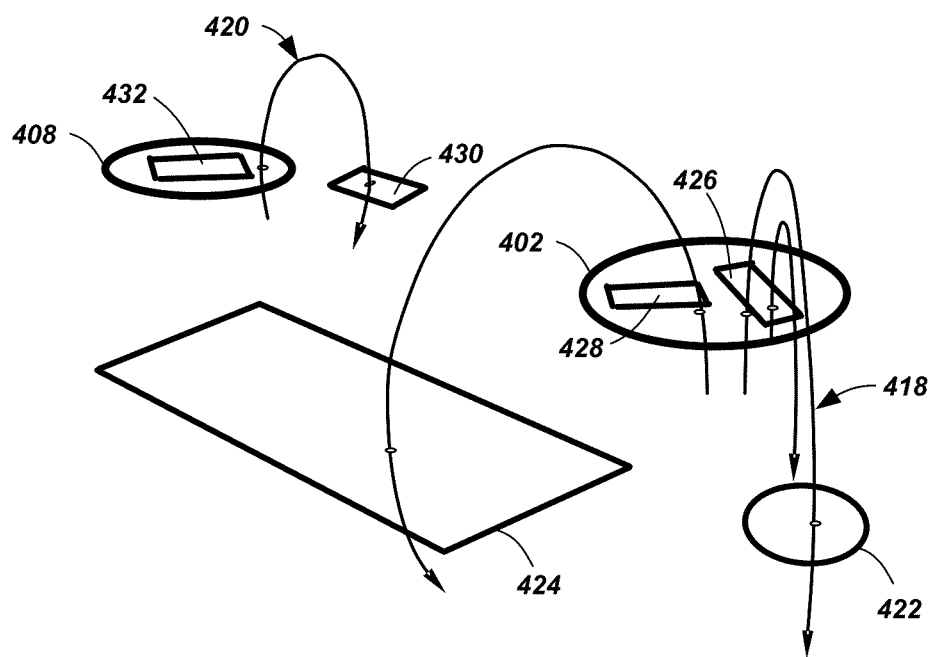
FIG. 8B illustrates a cutaway illustration of the various transmit, receive and passive energy relay antennas associated with the wireless power transmission system illustrated in FIG. 8A.

FIG. 8A illustrates a wireless power transmission system configured as a wireless desktop and FIG. 8B illustrates a cutaway illustration of the various transmit, receive and passive energy relay antennas associated with the wireless power transmission system 400. The wireless power transmission system 400 includes transmitters and receivers providing wireless power to personal electronic devices (PEDs) as well as peripheral devices without interconnection through power-conducting wired connections. In one exemplary embodiment, the wireless energy transfer is based on coupled magnetic resonance using antennas (loop coils) operating, for example, at one of a LF (e.g. 135 kHz) or at a HF (e.g. 13.56 MHz).

Wireless power transmission system 400 utilizes desktop space more efficiently and reduces desktop wiring by incorporating transmit and receive antennas into various physical elements of the wireless desktop. By way of example, a transmit antenna 402 may be integrated into any suitable host device that normally exists on a desktop such as a pedestal 404 of host device (monitor) 406. Similarly, a transmit antenna 408 may be integrated into a pedestal 410 of host device (lamp) 412. The transmitter (not shown) including transmit antenna 402, 408 may be powered directly from the 110/230 VAC mains voltage through wired power interfaces 414, 416 already existing in this host device 406, 412, thus not requiring an extra wired power interfaces 414, 416.

In one exemplary embodiment, the transmit antenna 402, 408 is embedded in the pedestal 404, 410 of a monitor 406 or a lamp 412. The pedestal 404, 410 may be disk-shaped embedding a circular wire loop antenna 402, 408 generating a fountain-shaped magnetic field 418, 420. Field 418, 420 may be generally vertically polarized at any position on the desktop in a plane of receive antennas 422-432 favoring coplanar orientation of receive antennas 422-432 integrated in wireless-power-enabled devices 434, 436. Coplanar orientation is considered more suitable for wire loop antennas integrated into a keyboard device 436, mouse device 434, and into many other electronic devices such as PEDs 438 (e.g., mobile phones, MP3 players, PDAs, etc.) if placed in a devices conventional orientation on the desktop.

In general, there may be more than one transmitter including transmit antenna on a desktop and power will be received from the transmit antenna that is dominant. Furthermore, a transmit antenna 402, 408 in a base such as pedestal 404, 410 may form a "power base" 440, 442 to provide an area to place devices such as PEDs 438 directly on the transmit antenna 402, 408 resulting in improved coupling, thus enabling high power transfer at high efficiency (close proximity coupling). Generally more than one device may be placed on such a power base depending on the area of the pad and the design of the transmitter.

Low power devices with long battery autonomy like a keyboard 436 or a computer mouse 434 may be placed in the proximity or vicinity of a power base (proximity or vicinity coupling). Furthermore, available power and transfer efficiency for these devices will be lower when other devices are additionally placed on the power base thus further loading the wireless power transmission system.

Though magnetic field strength in the vicinity of a power base will be below safety critical levels, a power base may additionally provide a function to automatically reduce magnetic field strength if a human is approaching. This function may use infrared or microwave person detection and can be activated by users that feel uncomfortable in presence of magnetic fields. Having activated this function, devices in its vicinity will essentially receive power during absence of humans.

Figure 9:
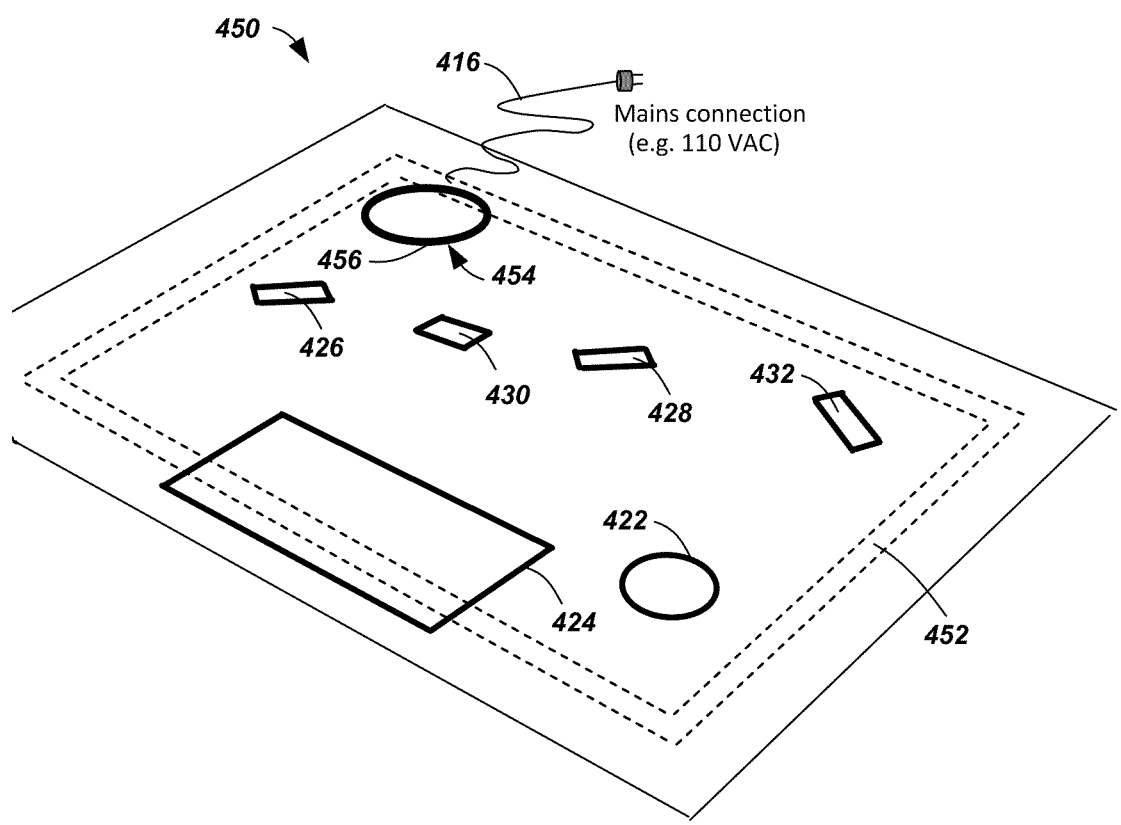
FIG. 9 illustrates a wireless power transmission system configured as a wireless desktop, in accordance with another exemplary embodiment.

FIG. 9 illustrates a wireless power transmission system configured as a wireless desktop. A wireless power transmission system 450 including a passive energy relay (parasitic antenna) 452 for expanding the resonant structure to cover a larger portion of the desktop area. Passive energy relay 452 may be configured, for example, beneath the desk, or integrated into the desk surface, or, alternatively, configured on the desk surface in the form of a flat structure such as a desk mat.

The wireless power transmission system 450 further includes transmitter 454 including a transmit antenna 456 which may be further integrated into a power base 440, 442 or FIG. 8A. Passive energy relay 452 when excited by transmitter 454 may provide appreciable performance and efficiency improvement of wireless desktop powering and charging. Excitation of passive energy relay 452 by transmitter 454 provides a convenience and safety benefit by not requiring integration of any main AC power to be supplied to other peripheral devices.

Figure 10:
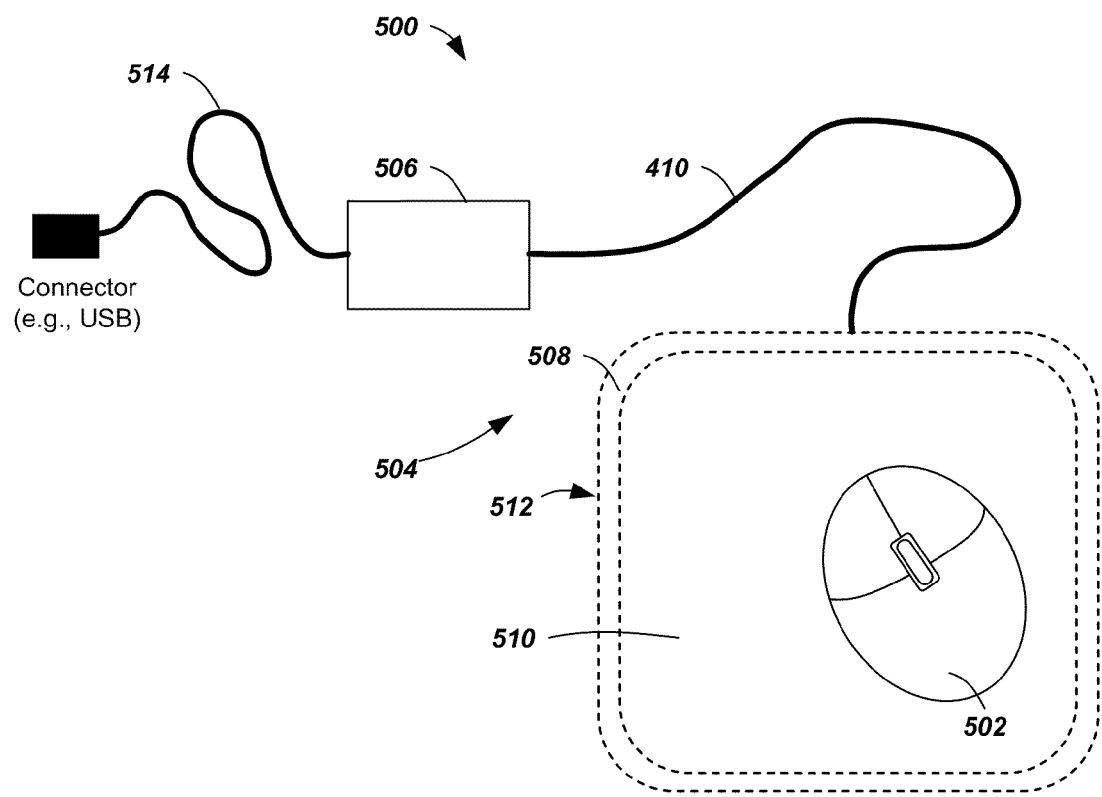
FIG. 10 illustrates a wireless power transmission system configured as a wireless power pad, in accordance with an exemplary embodiment.

FIG. 10 illustrates a wireless power transmission system configured as a wireless power pad, in accordance with an exemplary embodiment. The wireless power transmission system 500 includes a transmitter and one or more receivers providing wireless power to wireless powered devices, including personal electronic devices (PEDs) as well as peripheral devices, without interconnection through power-conducting wired connections. In one exemplary embodiment, the wireless energy transfer is based on coupled magnetic resonance using antennas (loop coils) operating, for example, at one of a LF (e.g. 135 kHz) or at a HF (e.g. 13.56 MHz).

Wireless power transmission system 500 illustrates a wireless powering/charging configuration for a wireless powered device 502 including a receiver 108 (FIG. 2), illustrated herein as a wireless powered computer mouse. Wireless power transmission system 500 further includes a transmitter 504 including transmit circuitry 506 and a transmit antenna 508 coupled together by a feeder cable 510. Transmit antenna 508 may be integrated into a portable substrate such as a portable mat 510 and may have a thickness of a few millimeters. Transmit antenna 508 and portable mat 510 form a portable power base 512. Portable power base 512 may also be known as a "charging pad" or a wireless power "mouse pad." The transmit antenna 508 is substantially disposed around the perimeter of a charging area of the charging pad.

Transmit antenna 508 is driven by transmit circuitry 506 including a transmit power conversion circuit 220 (FIG. 4), which may include an AC-to-high frequency AC converter or a DC-to-high frequency AC converter that may be DC supplied through a wired connection over feeder cable 514 from a USB port as conventionally available such as from personal computers or related peripherals. The transmit circuitry 506 may also incorporate the transceiver/receiver for a mouse wireless data link (not shown)

Figure 11:
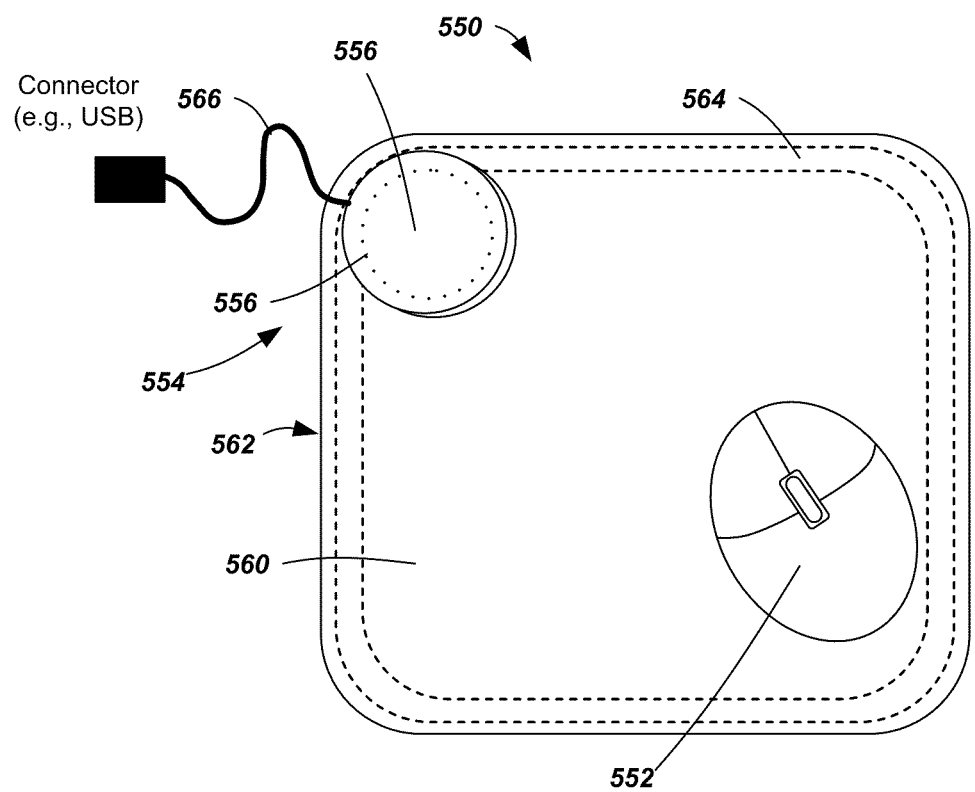
FIG. 11 illustrates a wireless power transmission system configured as a wireless power pad, in accordance with another exemplary embodiment.

FIG. 11 illustrates a wireless power transmission system configured as a wireless power pad, in accordance with another exemplary embodiment. The wireless power transmission system 550 includes a transmitter and one or more receivers providing wireless power to wireless powered devices, including personal electronic devices (PEDs) as well as peripheral devices, without interconnection through power-conducting wired connections. In one exemplary embodiment, the wireless energy transfer is based on coupled magnetic resonance using magnetic field antennas (loop coils) operating, for example, at one of a LF (e.g. 135 kHz) or at a HF (e.g. 13.56 MHz).

Wireless power transmission system 550 illustrates a wireless powering/charging configuration for a wireless powered device 552 including a receiver 108 (FIG. 2), illustrated herein as a wireless powered computer mouse. Wireless power transmission system 550 further includes a transmitter 554 including transmit circuitry 556 and a transmit antenna 558 integrated with the transmit circuitry 556. Wireless power transmission system 550 further includes a passive energy relay (parasitic antenna) 564 which is excited by transmitter 554. Passive energy relay 564 may be integrated into a portable substrate such as a portable mat 560 and may have a thickness of a few millimeters. Passive energy relay 564 and portable mat 560 form a portable power base 562. Portable power base 562 may also be known as a "charging pad" or a wireless power "mouse pad." The passive energy relay 564 (e.g., magnetic resonance antenna) is substantially disposed around the perimeter of a charging area of the charging pad.

In wireless power transmission system 550, a wired connection over feeder cable 566 is provided to transmitter 554 which is placed on the portable mat 560 to case resonance excitation to form an operational power base 562. Furthermore, the power base 562 may also be excited from separate transmitter exterior to the power base 562. The transmitter 554 may also be configured in a USB plug-in configuration. The transmitter 554 may also incorporate a transceiver/receiver (not shown) for a wireless data link of device (e.g., mouse) 552.

Figure 12:
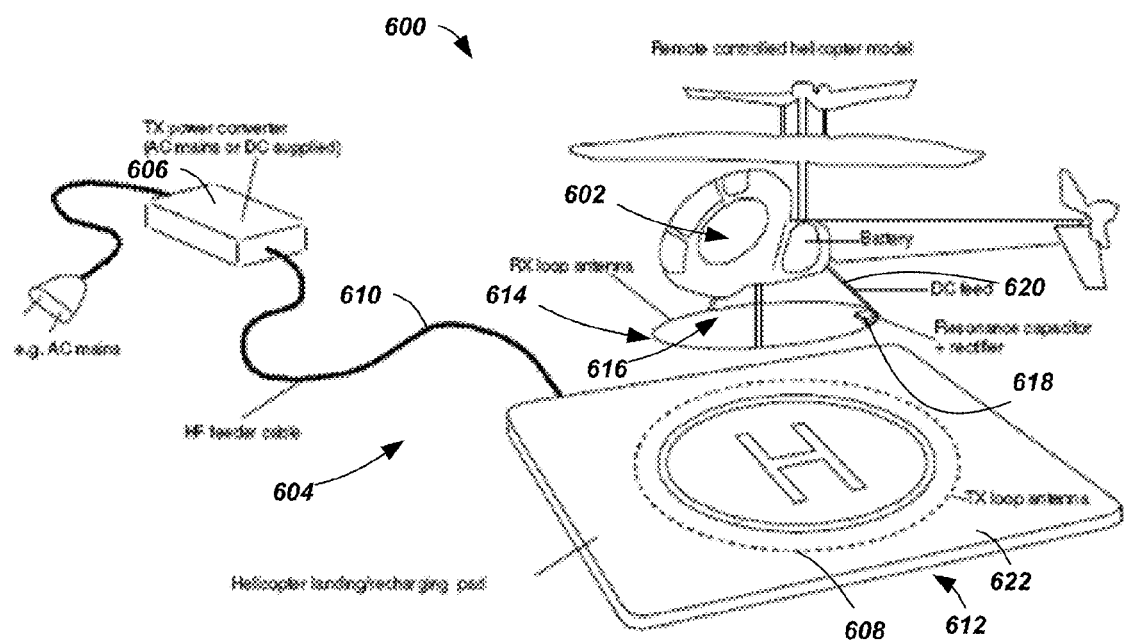
FIG. 12 illustrates a wireless power transmission system configured as a wireless power pad, in accordance with yet another exemplary embodiment.

FIG. 12 is a perspective view illustrating a wireless power transmission system configured as a wireless power pad, in accordance with yet another exemplary embodiment. The wireless power transmission system 600 includes a transmitter and one or more receivers providing wireless power to wireless powered devices, including personal electronic devices (PEDs) as well as peripheral devices, without interconnection through power-conducting wired connections. In one exemplary embodiment, the wireless energy transfer is based on coupled magnetic resonance using magnetic field antennas (loop coils) operating, for example, at one of a LF (e.g. 135 kHz) or at a HF (e.g. 13.56 MHz).

Wireless power transmission system 600 illustrates a wireless powering/charging configuration for a wireless powered device 602 including a receiver 108 (FIG. 2), illustrated herein as a wireless powered/rechargeable novelty or toy. Wireless power transmission system 600 further includes a transmitter 604 including transmit circuitry 606 and a transmit antenna 608 coupled together by a feeder cable 610. Transmit antenna 608 may be integrated into a portable substrate such as a portable mat 622 and may have a thickness of a few millimeters. Transmit antenna 608 and portable mat 622 form a portable power base 612. Portable power base 612 may also be known as a "charging pad." The transmit antenna 608 is substantially disposed around the perimeter of a charging area of the charging pad.

Transmit antenna 608 is driven by transmit circuitry 606 including a transmit power conversion circuit 220 (FIG. 4), which may include an AC-to-high frequency AC converter supplied by AC main power or a DC-to-high frequency AC converter that may be DC supplied from a USB port as conventionally available such as from personal computers or related peripherals.

Wireless powered device 602 may further include a receiver 616 including a receive antenna 614 and receiver circuitry 618. Receive antenna may be advantageously located on wireless powered device 602 to provide favorable proximity coupling with transmit antenna 608. The receive antenna 614 may be formed substantially about a physical interface (e.g., helicopter landing skids) of the wireless powered device 602 with the charging pad. Furthermore, receiver circuitry 618, including a rectifier 134 (FIG. 2), may be arranged on an assembly with capacitor $C_2$ of receive antenna 614. Receiver circuitry 618 may also be advantageously located to allow a feeder cable 620 to provide DC power to wireless powered device 602. With respect to wireless powered devices where device weight is an issue, such as flying vehicle applications, a higher frequency (e.g., 13.56 MHz) enables a lighter weight implementation over lower frequency embodiments.

Figure 13:
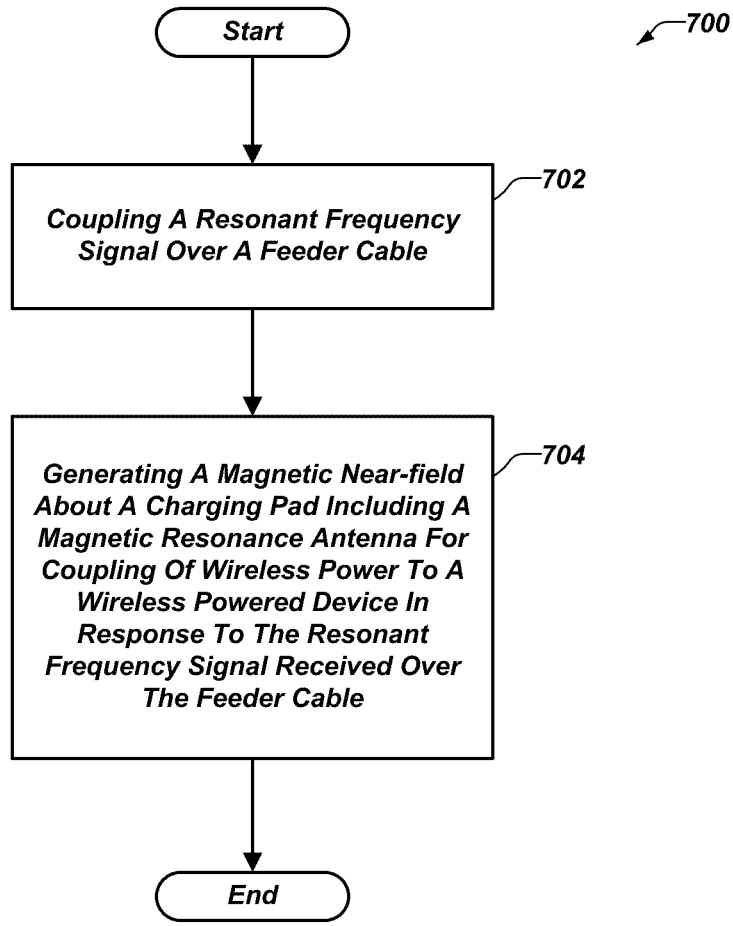
FIG. 13 illustrates a flowchart of a method for transmitting wireless power, in accordance with an exemplary embodiment.

FIG. 13 illustrates a flowchart of a method for transmitting wireless power, in accordance with an exemplary embodiment. Method 700 for transmitting wireless power is supported by the various structures and circuits described herein. Method 700 includes a step 702 for coupling a resonant frequency signal over a feeder cable. Method 700 further includes a step 704 for generating a magnetic near-field about a charging pad including a antenna for coupling of wireless power to a wireless powered device in response to the resonant frequency signal received over the feeder cable.

Those of skill in the art would understand that control information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, and controlled by computer software, or combinations of both. To clearly illustrate this interchangeability of hardware and software, various illustrative components, blocks, modules, circuits, and steps have been described above generally in terms of their functionality. Whether such functionality is implemented and controlled as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be controlled with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The control steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A portable wireless power charger, comprising:
   a mouse pad; and
   a relay antenna located within the mouse pad, the relay antenna comprising a resonant tank, the resonant tank configured to generate a magnetic field for coupling of wireless power to a wireless powered device including a receiver, the resonant tank further configured to receive power wirelessly from a transmitter exterior to the mouse pad and to the wireless powered device.

2. The portable wireless power charger of claim 1, wherein the transmitter comprises a transmit antenna, the transmit antenna configured to generate the magnetic field for direct coupling to the receiver of the wireless powered device.

3. The portable wireless power charger of claim 2, further comprising transmit circuitry configured to drive the transmit antenna and separated from the mouse pad by a feeder cable, the feeder cable configured to couple a resonant frequency signal between the transmit circuitry and the transmit antenna.

4. The portable wireless power charger of claim 1, wherein the relay antenna comprises a substantially continuous conductor, a portion of the conductor extending around substantially an entire perimeter of the mouse pad.

5. The portable wireless power charger of claim 1, wherein the transmit antenna is located to cause the relay antenna to resonate in response to an electromagnetic field generated by the transmit antenna.

6. The portable wireless power charger of claim 1, further comprising transmit circuitry configured to drive the transmit antenna and separated from the mouse pad by a feeder cable, the feeder cable configured to couple a signal different from the resonant frequency signal between the transmit circuitry and the transmit antenna.

7. The portable wireless charger of claim 1, wherein the relay antenna is configured to resonate at a substantially unmodulated radio frequency (RF).

8. The portable wireless charger of claim 7, wherein the substantially unmodulated RF comprises one of a first frequency band between 119 kHz to 135 kHz, a second frequency band between 6.765 MHz to 6.795 MHz and a third frequency band between 13.553 MHz to 13.567 MHz.

9. The portable wireless charger of claim 3, wherein mains power is separated from the mouse pad by the feeder cable.

10. The portable wireless charger of claim 1, wherein the wireless powered device is configured as a wireless powered computer mouse.

11. The portable wireless charger of claim 1, wherein the wireless powered device is configured as a wireless powered/rechargeable novelty.

12. A wireless power transmission system, comprising:
    a portable wireless power charger comprising:
    a mouse pad including a relay antenna located within the mouse pad, the relay antenna comprising a resonant tank, the resonant tank configured to generate a magnetic field, the resonant tank further configured to receive power wirelessly from a transmitter; and
    a wireless powered device including a receive antenna, the receive antenna formed substantially about a physical interface of the wireless powered device and the mouse pad, the transmitter exterior to the mouse pad and to the wireless powered device.

13. A method of transmitting wireless power, comprising:
    receiving a resonant frequency signal from a power source; and
    generating a magnetic field about a mouse pad, the mouse pad including a relay antenna located within the mouse pad, the relay antenna comprising a resonant tank, the resonant tank configured to couple wireless power to a wireless powered device in response to the magnetic field, the power source exterior to the mouse pad and to the wireless powered device.

14. The method of transmitting wireless power of claim 13, wherein generating a magnetic field comprises generating a magnetic field by a transmit antenna exterior to the mouse pad.

15. The method of transmitting wireless power of claim 13, wherein the relay antenna comprises a substantially continuous conductor, a portion of the conductor extending around substantially an entire perimeter of the mouse pad.

16. The method of transmitting wireless power of claim 14, wherein receiving a resonant frequency signal from the power source further comprises spatially separating the transmit antenna from circuitry coupled to mains power.

17. A portable wireless power charger, comprising:
- means for receiving a resonant frequency signal from a power source; and
- means for generating a magnetic field about a mouse pad, the mouse pad including a relay antenna located within the mouse pad, the relay antenna comprising a resonant tank, the resonant tank configured to couple wireless power to a wireless powered device in response to the magnetic field, the power source exterior to the mouse pad and to the wireless powered device.

18. The portable wireless power charger of claim 17, wherein the means for generating a magnetic field comprises means for generating a magnetic field by a transmit antenna exterior to the mouse pad.

19. The portable wireless power charger of claim 17, wherein the relay antenna comprises a substantially continuous conductor, a portion of the conductor extending around substantially an entire perimeter of the mouse pad.

20. The portable wireless power charger of claim 18, wherein the means for receiving a resonant frequency signal from the power source further comprises means for spatially separating the transmit antenna from circuitry coupled to mains power.

* * * * *